United States Patent [19]

Tolley

[11] Patent Number: 4,662,391
[45] Date of Patent: May 5, 1987

[54] METHOD AND APPARATUS FOR SPLITTING A LIQUID-VAPOR MIXTURE

[75] Inventor: Susan M. Tolley, Daville, Calif.

[73] Assignee: Chevron Research Company, San Francisco, Calif.

[21] Appl. No.: 666,077

[22] Filed: Oct. 5, 1984

[51] Int. Cl.[4] ............................................. F16K 21/18
[52] U.S. Cl. .................................... 137/393; 137/395; 137/558; 137/561 A; 166/250; 166/272; 166/303
[58] Field of Search .................. 166/250, 57, 303, 272, 166/90, 95, 97; 137/561 A, 561 R, 393, 395, 1, 558

[56] References Cited

U.S. PATENT DOCUMENTS

| | | | |
|---|---|---|---|
| 1,223,101 | 4/1917 | Pacziga | 55/186 |
| 2,110,430 | 3/1937 | Swanson | 62/126 |
| 2,168,404 | 5/1938 | Grant | 62/126 |
| 2,193,696 | 3/1938 | Ramsaur | 62/126 |
| 2,196,858 | 12/1938 | Gleason | 62/127 |
| 2,246,563 | 6/1941 | Winters | 137/395 |
| 3,643,689 | 2/1972 | Isreeli et al. | 137/561 A |
| 3,795,259 | 3/1974 | Brondin et al. | 137/561 A |
| 3,823,731 | 7/1974 | Gordon | 137/395 |
| 3,899,000 | 8/1975 | Ohlswager et al. | 137/561 |
| 4,140,178 | 2/1979 | Ohlswager et al. | 165/161 |
| 4,156,421 | 5/1979 | Cradeur et al. | 166/303 |
| 4,268,283 | 5/1981 | Roberts | 166/97 |
| 4,293,025 | 10/1981 | Ohlswager et al. | 165/1 |
| 4,322,603 | 3/1982 | Bright | 166/272 |
| 4,396,063 | 8/1983 | Godbey | 166/250 |
| 4,398,604 | 8/1983 | Krajicek et al. | 166/250 |
| 4,505,297 | 3/1985 | Leech, III et al. | 137/561 A |

Primary Examiner—A. Michael Chambers
Attorney, Agent, or Firm—S. R. LaPaglia; E. J. Keeling; V. A. Norviel

[57] ABSTRACT

A flow splitter for liquid-vapor mixtures wherein a reservoir has an inlet at a top end and a drain at a bottom end of a vertical axis, and also has a plurality of outlets in a level plane perpendicular to the vertical axis. Each inlet is connected by an equally sized aperture in a sidewall of the reservoir to a central cavity of the reservoir in which the liquid collects. When the liquid accumulates to the point that it reaches the lower edge of each aperture, the liquid divides equally among the apertures to become re-entrained with a substantially equal portion of the vapor passing through each outlet. The liquid may be removed through the drain to control the proportion of liquid in the split mixture.

7 Claims, 4 Drawing Figures

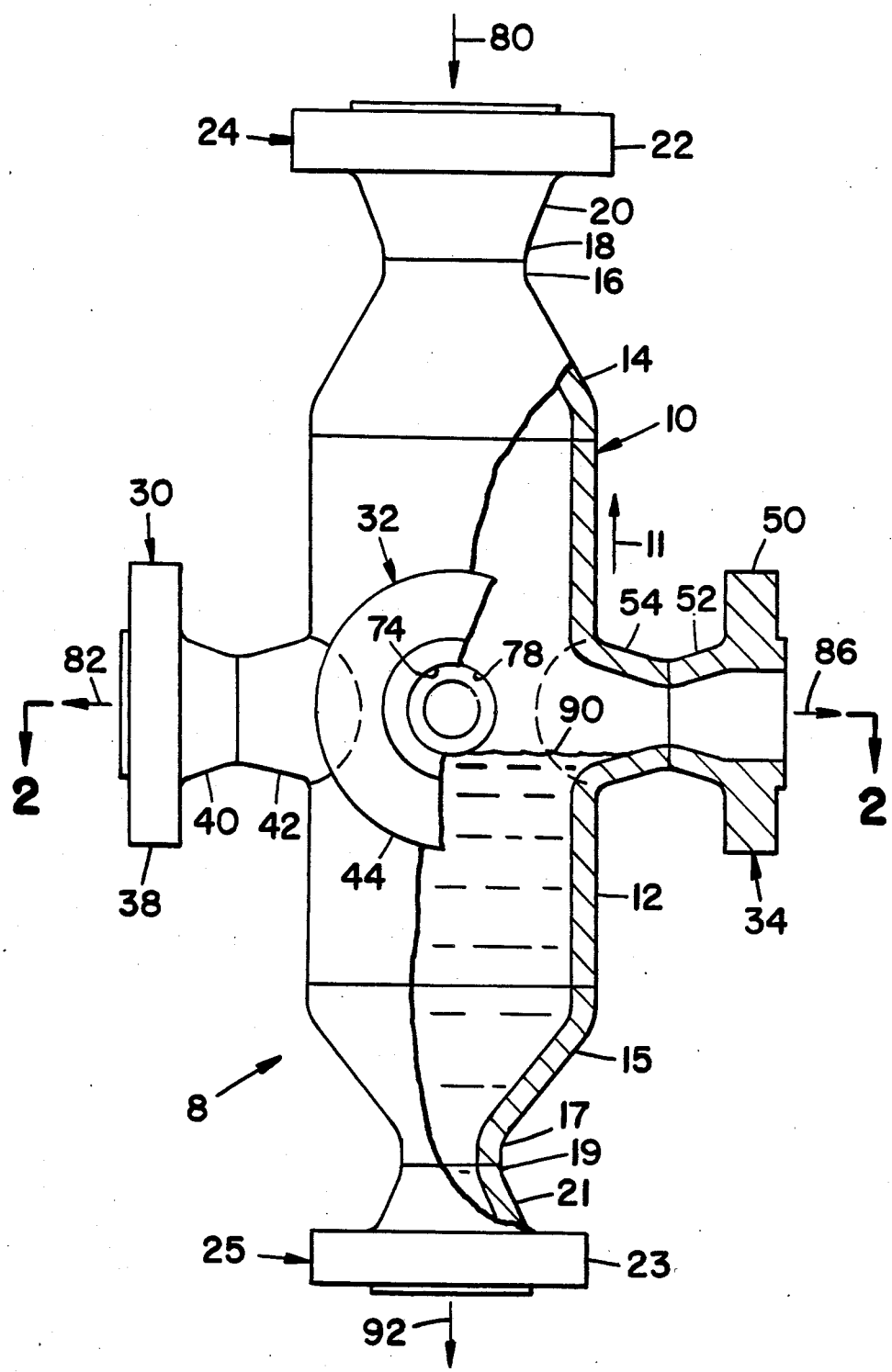
FIG_1

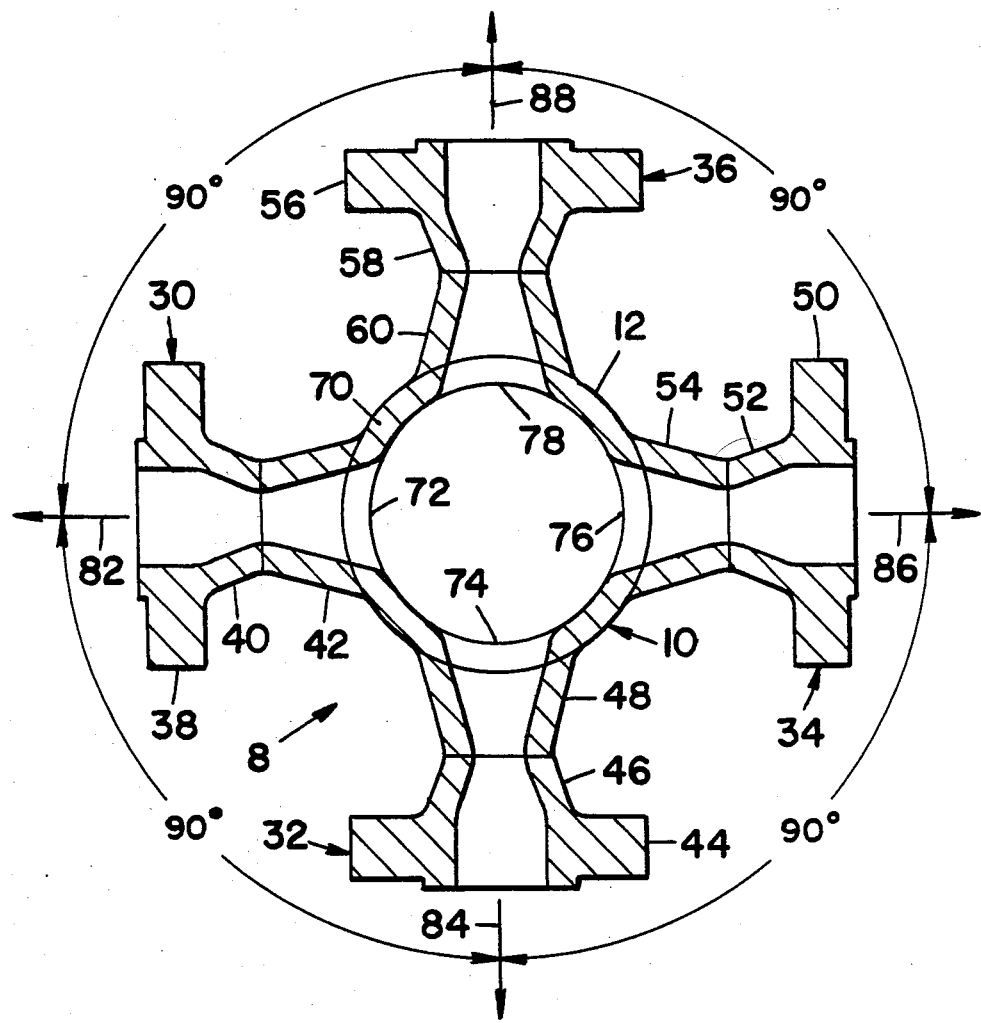
FIG_2

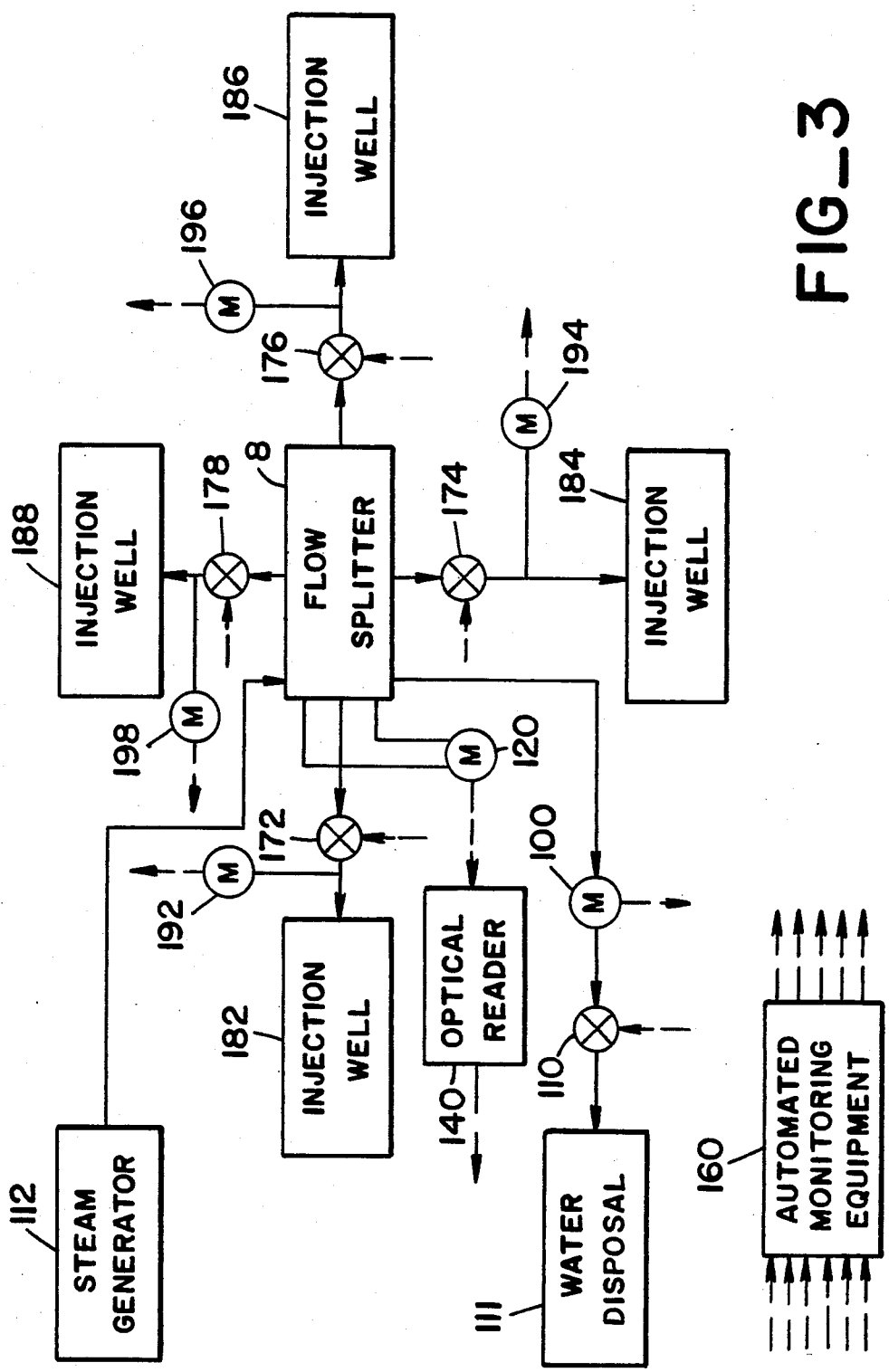
FIG_3

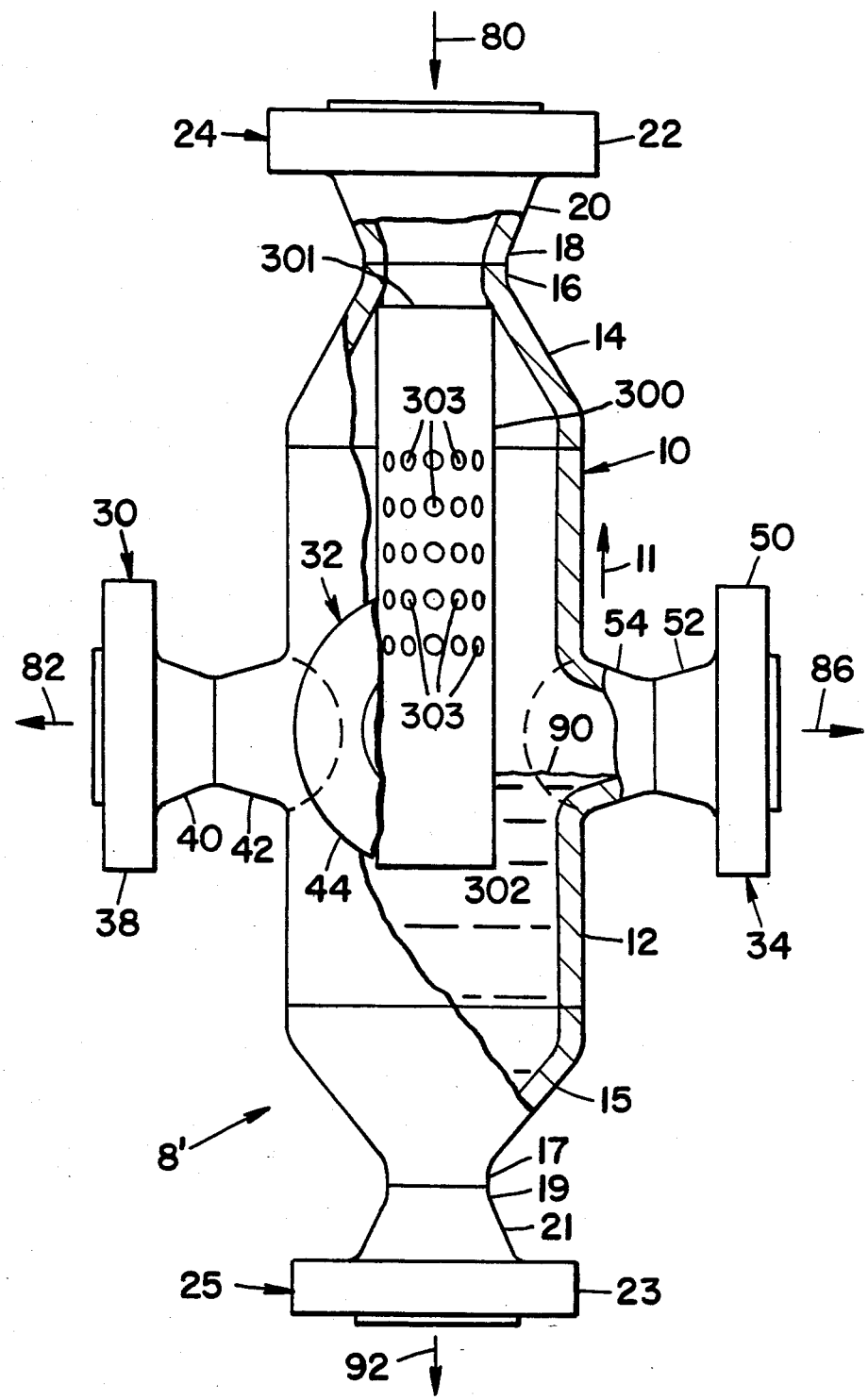
FIG_4

METHOD AND APPARATUS FOR SPLITTING A LIQUID-VAPOR MIXTURE

BACKGROUND OF THE INVENTION

The present invention pertains in general to a method and apparatus for splitting flow and in particular to a method and apparatus for splitting the flow of a vapor-liquid mixture.

In oil fields where steam is injected into a formation as part of an enhanced oil recovery (EOR) program, it is important to know the quantity and quality (ratio of steam to water) of steam being injected into each of a plurality of wells. Planning an injection program for each well and evaluating its effectiveness require a knowledge of conditions in each well. Implementing an effective EOR program requires the ability to control the quality and quantity of steam delivered to each well.

Although the quantity of steam applied to each well may be effectively controlled by valves or chokes, it is difficult to obtain a desired quality for each of a plurality of injection wells from a single steam source. When the flow of steam is split, different amounts of liquid water might flow into each of the split branches of the flow.

To predictably split the flow of a liquid-vapor mixture, one approach involves providing an inlet at the top of a vessel having a plurality of outlet pipes projecting upward through the bottom of the vessel to equal heights, as found for example in U.S. Pat. Nos. 3,899,000, 4,140,178 and 4,293,025. A splash baffle between the inlet and outlet pipes prevents substantially all liquid in the flow from falling directly into the outlet pipes. The liquid accumulates in the vessel and enters the outlet pipes by spilling over the lip of the open end of each outlet pipe or through holes bored in the side of each outlet pipe. One drawback to this approach is that it removes virtually all liquid from the flow so that a large vessel is required at a correspondingly large cost. Another drawback is that in order to accommodate the outlet pipes, the vessel may have to be specially made, particularly in the larger sizes, because large enough vessels having the required wall thickness for use with steam are not readily available.

Another approach, exemplified by U.S. Pat. No. 4,396,063, passes the mixture to be split through a motionless mixer in order to homogenize the liquid and vapor phases and then immediately passes the mixture against a blade in a "wye" conduit. This approach has the disadvantages of requiring the use of non-standard equipment and of assuming that liquid that drops out at the wye will be re-entrained in the flow in equal amounts-down each branch.

Absent from either approach is the ability to inexpensively and reliably divide a flowing liquid-vapor mixture into streams of substantially equal quality.

SUMMARY OF THE INVENTION

Accordingly, the present invention involves apparatus for splitting a liquid-vapor mixture into a plurality of streams or for adjusting the liquid-vapor ratio by liquid removal. The apparatus comprises a reservoir having at least one side wall defining n apertures of equal size, $n>1$. The apertures are at a common gravitational potential. Each of the apertures is symmetrically distributed at 360/n degrees about the circumference of the reservoir. The reservoir has a top defining an opening above and equally distant from each of the apertures. The reservoir also has a bottom. Each of the plurality of outlet pipes terminate at one of the apertures and an inlet has an open end communicating with the reservoir through the opening in the top of the reservoir.

A method of splitting a liquid-vapor mixture into a plurality of streams according to the present invention comprises the step of: providing a reservoir having at least one sidewall defining n apertures of equal size and at a common gravitational potential, $n>1$, each of the apertures being symmetrically distributed at every 360/n degrees about the circumference of the reservoir, the reservoir having a top defining an inlet opening above and equally distant from each of the apertures, the reservoir having a bottom; a plurality of outlets, each pipe being coupled to one of the apertures; and an inlet having an open end communicating with the reservoir through the opening in said top of the reservoir. The method also comprises the step of introducing steam a liquid-vapor mixture through the inlet opening.

BRIEF DESCRIPTION OF THE DRAWING

FIG. 1 is a view in partial section of a first embodiment of the present invention;

FIG. 2 is a view in horizontal cross-section of the apparatus of FIG. 1 along line 2;

FIG. 3 is a block diagram of a system for controlling steam quality and quantity according to the present invention; and FIG. 4 is a view in partial section of a second embodiment of the present invention.

DESCRIPTION OF THE PREFERRED EMBODIMENT

In a first embodiment of the apparatus according to the present invention as illustrated in FIG. 1, the reservoir 10 has a hollow cylindrical center portion 12. Reservoir 10 is positioned so that arrow 11 points in a vertical direction.

Above and below cylindrical portion 12, hollow conical portions 14 and 15 are respectively connected at their widest points to hollow cylindrical portion 12. At an upper end of hollow conical portion 14, a hollow cylindrical inlet 16 is connected by way of a hollow cylindrical lip 18 and a hollow conical portion 20 to a hollow cylindrical inlet flange 22. Similarly, beneath hollow conical portion 15 is a hollow cylindrical inlet 17. Inlet 17 is sequentially connected by way of a hollow cylindrical lid 19 and a hollow conical portion 21 to a hollow cylindrical drain flange 23.

Elements 18, 20 and 22 make up inlet 24 while elements 19, 21 and 23 form drain 25. The connection between cylindrical portions 16 and 18 forms an inlet opening. Similarly, the connection between cylindrical portions 17 and 19 forms a drain opening.

Four outlets, 30, 32, 34 and 36 (not shown), are symmetrically distributed in a level plane, i.e., at a common gravitational potential, about the middle of central portion 12. Each inlet is composed of a flange connected to a wide end of a first hollow conical portion which is in turn connected to a narrow end of a second hollow conical portion, the wide end of which is connected to cylindrical portion 12.

As shown in FIG. 2, wherein elements also illustrated in FIG. 1 are identified by the same reference numerals which are used to identify them therein, the four outlets 30, 32, 34 and 36, are symmetrically distributed at every 90° about the circumference of reservoir 10. Outlet 30 has a flange 38 connected to a first conical portion 40 which is in turn connected to a second conical portion 42. Outlet 32 has a flange 44 connected to a first conical portion 46 which is in turn connected to a second conical portion 48. Similarly, outlet 34 has a flange 50 connected to a first conical portion 52 which is in turn connected to a second conical portion 54. Outlet 36 has a flange 56 connected to a first conical portion 58 which is in turn connected to a second conical portion 60.

Reservoir 10 has a sidewall 70 which has circular apertures of equal size, 72, 74, 76 and 78, to which internal cavities of the second conical portions of outlets 30, 32, 34 and 36 are respectively connected.

As shown in FIG. 3, inlet 24 is connected by way of a pipe to a steam generator 112. Outlets 30, 32, 34 and 36 are respectively connected to pipes leading to steam injection wells 182, 184, 186 and 188 at which it is desirable to have an equal quality or quantity of steam by way of valves 172, 174, 176 and 178 respectively. Drain 25 is connected by way of a turbine meter 100 to a valve 110 which is in turn connected to a pipe leading to a water disposal apparatus 111.

Valve 110 is used to maintain the liquid level substantially near the bottom of the outlets at which point changes in the valve setting allow for control of the amount of water removed from or retained in the steam. For example, a given flow of water may be permitted to pass out of reservoir 10 through valve 110 in order to provide for a given amount of water to leave reservoir 10 by way of the outlets. Likewise, the valve may be fully opened in order to remove as much water as possible from the steam.

Toward the end of monitoring the water level in reservoir 10, particularly in order to ensure that all water is removed, a first nipple may be installed above the level of the outlets, a second nipple may be installed below the level of the outlets and a level indicating meter 120 installed between the two nipples. An optical reader 140 may be installed in association with the level indicator to provide data to automatic monitoring equipment 160. Monitoring equipment 160 may comprise a computer and is connected to valves 110, 172, 174, 176 and 178.

The quality of steam at injection wells 182, 184, 186 and 188 may be raised by transmitting a signal from equipment 160 to open valve 110 and thereby decreasing the fraction of water in the mixture at the outlets. Meter 100 is connected to equipment 100 and a signal from it confirms a change in flow out of drain 25. A flowrate indicative of a desired quality level may be determined through known methods of calculation and calibration.

Flow meters 192, 194, 196 and 198 are respectively connected between valve 172 and well 182, between valves 174 and well 184, between valve 176 and well 186 and between valve 178 and well 188. Each of these meters is connected to equipment 160 and provides an output signal indicative of the flow rate of steam entering each well to equipment 160. Equipment 160 opens or closes valves 172, 174, 176 and 178 to adjust the flow rate and, hence, the quantity of steam provided to the corresponding wells. Because the same quality of steam is provided to each well through splitter 8, and because the quantity of steam provided to each well is adjusted by way of valves 172, 174, 176 and 178, planning and implementing a desired EOR program by controlling both steam quality and quantity is facilitated.

In order to be most effective, the length and diameter of pipe should be the same between splitter 8 and each of wells 182, 184, 186 and 188. Secondary flow splitters may be used to further divide the streams from outlets 30, 32, 34 and 36. Maintaining the equality of length and diameter of pipe from a secondary splitter to each well it feeds also promotes equal quality among the wells. Each secondary splitter may be placed between the primary splitter and the valves controlling the quantity of steam to each of the wells it feeds.

As indicated in FIG. 1, when splitter 8 is in use, steam enters apparatus 8 by passing directly downward in the direction of arrow 80 through inlet 24 and into reservoir 10. Within reservoir 10, water drops out of the steam. The water collects at the bottom of reservoir 10 above drain 25 until it reaches level 90, which is at the same height as the lower edge of each of apertures 72, 74, 76 and 78. When water reaches level 90, it flows into outlets 30, 32, 34 and 36 in equal proportions, because these outlets are at the same level and apertures 72, 74, 76 and 78 are the same size. This water flowing into the outlets is re-entrained with substantially equal portions of steam so that streams of the liquid-vapor mixture having substantially equal quantity and quality flow through outlets 30, 32, 34 and 36 in the direction of arrows 82, 84, 86 and 88, respectively.

As illustrated in FIG. 4, wherein elements which also appear in FIGS. 1 and 2 are identified by the same reference numerals as used therein, an alternative embodiment of the flow splitter according to the present invention is referenced by numeral 8' to indicate a different embodiment. A cylindrical pipe 300 has a first end 301 welded to portion 14 about its internal circumference. A second end 302 of pipe 301 is located below the level of the lowest point of outlets 30, 32, 34 and 36 and preferably below an expected water level in reservoir 10. Pipe 300 is perforated by a plurality of holes below its first end 301 and above both the uppermost point of outlets 30, 32, 34 and 36. Pipe 300 directs liquid water to a point below the level of the outlets, which promotes even splitting at least in part by preventing an annular flow from passing directly through splitter 8 to the outlets, and breaks up waves in water collected at the bottom of reservoir 10, which prevents waves from sloshing over unequally into the outlets.

All of the elements of apparatus 8 and 8' are readily constructed by one skilled in the art from metal parts and fittings of the sort commonly manufactured for use in piping systems. For example, because reservoir 10 may be narrower than those vessels where outlet pipes pass through the bottom, reservoir 10 may be made from readily available pipe rather than having to be specially cast. For example, the internal diameter of reservoir 10 may be twice that of inlet 24.

The dimensions of apparatus 8 may be varied to suit particular applications, but certain general guidelines may be provided. Within limits, the larger the portion of reservoir 12 above the outlets, the better liquid drops out of the liquid-vapor mixture. Placing the outlets a distance of 2 or more times the diameter of reservoir 12 below the inlet also promotes the dropping out of the liquid.

Monitoring equipment 160 may comprise any suitable control apparatus, such as indicators, manual controls and electronic devices.

Although apparatus 8 has been described in terms of splitting a mixture of water and steam, the apparatus according to the present invention may be advantageously employed with other liquid-vapor mixtures (or gas-liquid or gas-liquid vapor mixtures where a vapor is distinguished from a gas as being close to a liquid state or containing liquid particles), as is readily understood by one skilled in the art. Likewise, although four outlets are shown in the preferred embodiment, it is clear to one skilled in the art that any number of symmetrically distributed apertures may be employed where n is the number of apertures and where the apertures are spaced at every 360/n degrees about the circumference of the reservoir 12. It is also clear to one skilled in the art that reservoir 12 need not be cylindrical but may be of any symmetrical shape which provides substantially equivalent environments for each of the outlets. For example, a nipple may be installed in sidewall 70 of reservoir 8 or 8'. This nipple may be used to treat the water collected in reservoir 8 or 8' with treatment materials such as salts or corrosion inhibitors. Similarly, the nipple may be used to sample the water for the purpose of analysis.

While the present invention has been described in terms of the preferred embodiment, further modifications and improvements will occur to one skilled in the art.

I desire it to be understood, therefore, that this invention is not limited to the particular form shown and that I intend in the appended claims to cover all such improvements and variations which come within the scope of the invention as claimed.

What is claimed is:

1. Apparatus for splitting a liquid-vapor mixture into a plurality of streams comprising;
    a reservoir having at least one sidewall defining n apertures (where n=the number of apertures) of equal size and along a level plane, i.e., at a common gravitational potential, n>1, each of said apertures being symmetrically distributed at every 360/n degrees about the circumference of said reservoir and substantially at a level of liquid that will be present in said reservoir, said reservoir having a top defining an inlet opening above and equally distant from each of said apertures, said reservoir having a bottom;
    a plurality of outlets, each outlet being coupled to one of said apertures;
    an inlet having an open end communicating with said reservoir through said opening in said top of said reservoir;
    a drain in the bottom of said reservoir; and
    means for controlling a flow of liquid out of said drain at a rate that will maintain a liquid level at said outlets.

2. The apparatus as recited in claim 1 further comprising a plurality of outlet valves, one each of said plurality of outlet valves being connected to each of said outlets.

3. The apparatus as recited in claim 2 further comprising:
    means for measuring outlet flow connected to each of said plurality of outlets; and
    automated monitoring equipment connected to said means for measuring outlet flow, operably connected to said means for controlling a flow of liquid out of said drain, and to each of said plurality of outlet valves.

4. The apparatus as recited in claim 3 further comprising a pipe within said reservoir, said pipe defining a plurality of perforations below said inlet and above said apertures, having a first end connected to said inlet opening and having a second end below said apertures.

5. A method of splitting a liquid-vapor mixture into a plurality of streams comprising the steps of:
    providing a reservoir having at least one sidewall defining n apertures (where n=the number of apertures) of equal size and lying along a level plane, n>1, each of the apertures being symmetrically distributed at every 360/n degrees about the circumference of the reservoir, each aperture being connected to one of the plurality of outlets, the reservoir having a top defining an inlet opening above and equally-distant from each of the apertures, the reservoir having a bottom drain; a plurality of outlet pipes, each pipe being coupled to one of the apertures; and an inlet having an open end communicating with said reservoir through the inlet opening in the top of the reservoir;
    introducing a liquid-vapor mixture through said inlet; and
    maintaining a liquid level at the bottom of said apertures by controlling a fluid flow out of said bottom drain.

6. The method of claim 5 further comprising the steps of:
    measuring the quality of steam from said outlets; and
    adjusting said fluid flow out of said bottom drain to control said steam quality.

7. The method of claim 6 further comprising the step of introducing a treatment chemical into said reservoir.

* * * * *